(12) United States Patent
Serfaty et al.

(10) Patent No.: US 7,605,686 B2
(45) Date of Patent: Oct. 20, 2009

(54) ALERTING SYSTEM FOR A COMMUNICATION DEVICE

(75) Inventors: Salomon Serfaty, Gaash (IL); Izak Avayu, Mevaseret Tzion (IL); Eyal Brami, Matan (IL); Alexander Shmoukler, Bat-Yam (IL)

(73) Assignee: Motorola, Inc., Schaumburg, IL (US)

( * ) Notice: Subject to any disclaimer, the term of this patent is extended or adjusted under 35 U.S.C. 154(b) by 331 days.

(21) Appl. No.: 11/560,683

(22) Filed: Nov. 16, 2006

(65) Prior Publication Data

US 2008/0118091 A1 May 22, 2008

(51) Int. Cl.
*G08B 3/10* (2006.01)

(52) U.S. Cl. .......... 340/384.73; 381/87; 381/162; 381/163; 455/350; 455/550.1; 455/90.2; 340/384.6; 340/384.5; 340/692

(58) Field of Classification Search .......... 340/407.1, 340/384.1, 384.6, 384.73, 388.1, 692, 384.5; 381/71.1, 59, 81, 123, 111, 113, 116, 117, 381/163, 87, 162; 455/350, 556.1, 556.2, 455/552, 575.1, 550.1, 90.2
See application file for complete search history.

(56) References Cited

U.S. PATENT DOCUMENTS

| 5,070,317 | A | * | 12/1991 | Bhagat ...................... 336/200 |
| 5,247,700 | A | * | 9/1993 | Wohl et al. ................ 455/552.1 |
| 5,790,679 | A | * | 8/1998 | Hawker et al. ............... 381/163 |
| 6,002,945 | A | * | 12/1999 | McDuffee ................ 455/556.1 |
| 6,002,949 | A | * | 12/1999 | Hawker et al. ........... 455/569.1 |
| 6,035,959 | A | | 3/2000 | Schaedler |
| 6,217,979 | B1 | * | 4/2001 | Takeuchi et al. ............ 428/138 |
| 6,517,107 | B2 | * | 2/2003 | Johnson et al. ............. 280/735 |
| 7,113,813 | B2 | * | 9/2006 | Shimokawatoko et al. ........................ 455/575.3 |
| 7,263,196 | B2 | * | 8/2007 | Aubauer et al. ............. 381/332 |
| 2002/0121966 | A1 | * | 9/2002 | Woodard et al. ......... 340/384.6 |
| 2003/0002682 | A1 | * | 1/2003 | Smith et al. .................... 381/2 |
| 2005/0136453 | A1 | | 6/2005 | Sherman |
| 2005/0136848 | A1 | | 6/2005 | Murray |
| 2006/0084465 | A1 | * | 4/2006 | Kim ........................ 455/550.1 |

* cited by examiner

*Primary Examiner*—Benjamin C Lee
*Assistant Examiner*—Sigmund Tang
(74) *Attorney, Agent, or Firm*—Randi L. Karpinia; Anthony P. Curtis (57) ABSTRACT

An alerting system (202) for a communication device (100) is provided. The alerting system is designed to operate in a plurality of operating modes. The alerting system includes a transducer (204) and an electromechanical switch (106). The transducer transforms electrical impulses into vibrations. The electromechanical switch couples the transducer to a first component (206) of the communication device in a first operating mode. Further, the electromechanical switch couples the transducers to a second component (208) of the communication device in a second operating mode.

24 Claims, 5 Drawing Sheets

PRIOR ART

ALERTING SYSTEM FOR A COMMUNICATION DEVICE

FIELD OF THE INVENTION

The present invention generally relates to the field of communication devices. More specifically, it relates to an alerting system for a communication device.

BACKGROUND

Communication devices, for instance, two-way radios, mobile telephones, personal digital assistants (PDAs), and laptop computers are becoming increasingly popular today. Communication devices are used to transmit audio signals from one user to another by converting audio signals into electrical impulses in a transmitter's device. These electrical impulses are transmitted over predefined frequency ranges and subsequently converted back to audio signals in a receiver's device. The conversion of audio signals into electrical impulses and the subsequent conversion of the electrical impulses to audio signals are performed by components known as transducers. Traditional communication devices include two transducers. One transducer performs the function of a microphone (to convert the audio voice of a caller into electrical impulses) and another transducer performs the function of an earpiece (to convert the electrical impulses into audible sound). As communication devices become smaller yet more complex, the space utilized by these transducers become more valuable to the device designers.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and to explain various principles and advantages, all in accordance with the present invention

Skilled artisans will appreciate that elements in the figures are illustrated for simplicity and clarity and have not necessarily been drawn to scale. For example, the dimensions of some of the elements in the figures may be exaggerated, relative to other elements, to help to improve an understanding of embodiments of the present invention.

DETAILED DESCRIPTION

Before describing in detail the particular alerting system for a communication device, in accordance with various embodiments of the present invention, it should be observed that the present invention resides primarily in combinations of apparatus components and method steps related to an alerting system for a communication device. Accordingly, the apparatus components and method steps have been represented, where appropriate, by conventional symbols in the drawings, showing only those specific details that are pertinent for an understanding of the present invention, so as not to obscure the disclosure with details that will be readily apparent to those of ordinary skill in the art, having the benefit of the description herein.

In this document, the terms 'comprises,' 'comprising,' or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by 'comprises . . . a' does not, without more constraints, preclude the existence of additional identical elements in the process, method, article or apparatus that comprises the element. The term 'another,' as used in this document, is defined as at least a second or more. The terms 'includes' and/or 'having', as used herein, are defined as comprising.

There is a continuous demand for smaller, thinner, and sleeker communication devices. To reduce the size of such communication devices, it is therefore desirable to utilize a single transducer, as compared to two transducers. Transducers such as piezoelectric transducers can be customized to work in a speaker mode, when a user of the communication device can hear audible sound from the communication device, as well as a microphone mode, when the user can speak into the communication device. Piezoelectric transducers are compact, simple and highly reliable, and consume only minimal energy to produce a high level of sound, as compared to alternative electromagnetic transducers.

In some communication devices, single transducers that work both in the speaker mode and the microphone mode are attached to a single component that vibrates. This single component can be a lens for a visual display device, a keypad, or a plate inside the communication device. In the speaker mode, audio power of the speaker mode is set to low, such that the intensity of the audible sound produced by the vibrating single component, such as the lens, does not harm the user's ear. In the microphone mode, the audio power needs to be higher, as compared to the speaker mode, since the user speaks into the communication device from a distance. However, if the lens is also used in the microphone, the user might inadvertently bring the lens close to his ear, causing harm to the ear. Therefore, an alerting system for a communication device that does not cause harm to the user's ear is preferable.

In one embodiment, an alerting system for a communication device is provided. The alerting system is designed to operate in a plurality of operating modes. The alerting system includes a transducer and an electromechanical switch. The transducer, in operation, transforms electrical impulses into vibrations. The electromechanical switch couples the transducer to a first component of the communication device in a first operating mode. Further, the electromechanical switch couples the transducers to a second component of the communication device in a second operating mode.

In another embodiment, a communication device designed to operate in a plurality of operating modes is provided. The communication device includes a first component, a second component, a transducer and an electromechanical switch. The first component is located in a first section of the communication device and the second component is located in a second section of the communication device. The transducer, in operation, transforms vibrations into electrical impulses. The electromechanical switch couples the transducer to the first component in a first operating mode. Further, the electromechanical switch couples the transducer to the second component in a second operating mode.

In yet another embodiment, a method of operation in a communication device is provided. The communication device includes a vibratory transducer and at least two components. The method includes electromechanically coupling the vibratory transducer to a first component to provide a first vibration manner in a first mode of operation. The method also includes electromechanically coupling the vibratory transducer to a second component to provide a second vibration manner in a second mode of operation.

Figure 1:
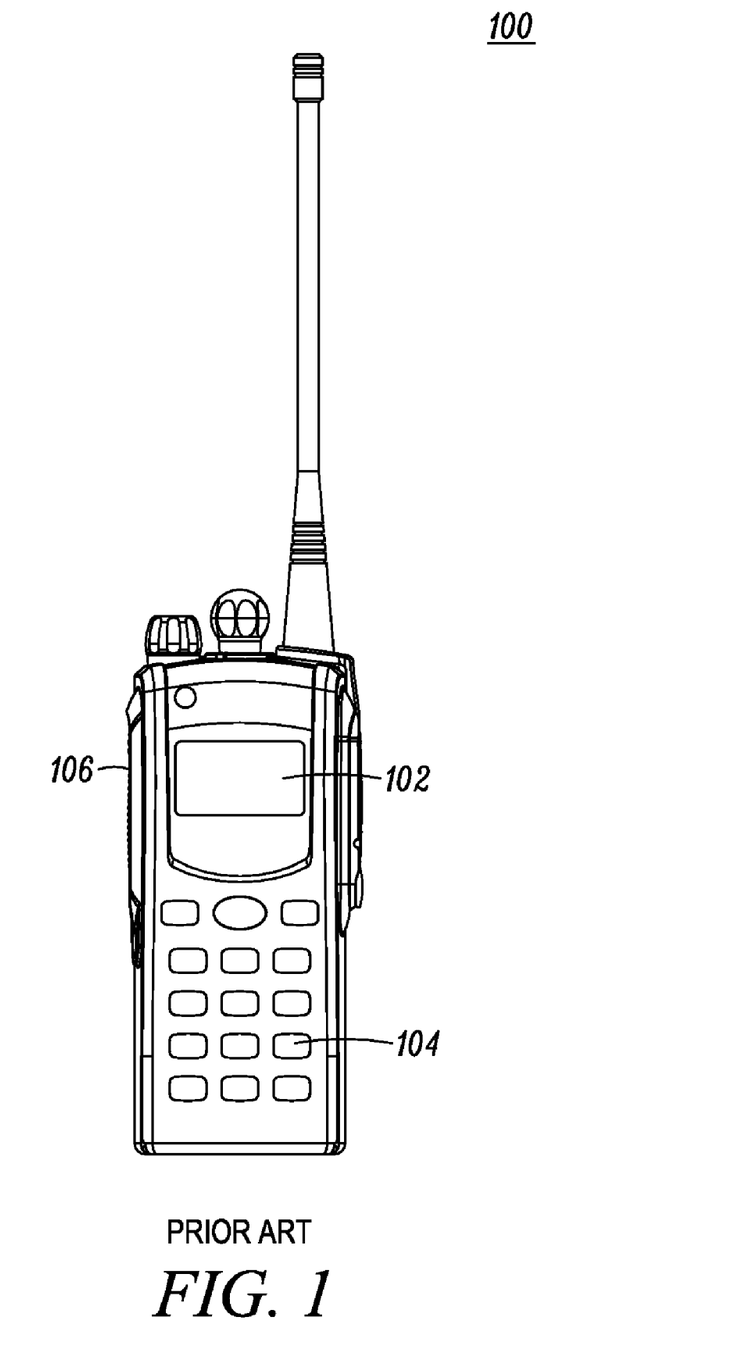
FIG. 1 illustrates an exemplary communication device, where various embodiments of the present invention can be practiced.

FIG. 1 illustrates an exemplary communication device 100, where various embodiments of the present invention can be practiced. Though the communication device 100 is depicted as a two-way radio in FIG. 1, it will be apparent to a person ordinarily skilled in the art that the communication device 100 may be any other communication device apart from the two-way radio. The communication device 100 can be, for example, a mobile telephone, a cellular telephone, a Personal Digital Assistant (PDA), a mobile analog radio, or an equivalent. The communication device 100 includes a lens 102, a keypad 104, and an electromechanical switch 106. The lens 102 covers a visual display device, such as a Liquid Crystal Display (LCD), of the communication device 100. The lens 102 protects the visual display device from external damages. The keypad 104 of the communication device 100 can be used to perform various operations such as dialing a telephone number, typing text messages or navigating the menu of the communication device 100. The electromechanical switch 106 can be used to manually switch the communication device 100 between a voice reception mode and a voice transmit mode. For an embodiment of the present invention, the communication device 100 is a mobile telephone. In this embodiment, the electromechanical switch 106 can be located inside the communication device 100 and can be operated automatically. In the voice reception mode, the communication device 100, such as the two-way radio, receives voice messages in the form of electric impulses. The communication device 100 then converts the electric impulses to audible sound, which can be heard by a user of the communication device 100. The voice reception mode is hereinafter referred to as a speaker mode. In the voice transmit mode, sound waves produced by the user of the communication device 100 are converted into electric impulses. These electric impulses are subsequently transmitted by the communication device 100 over a radio channel frequency. The voice transmit mode is hereinafter referred to as a microphone mode. It will be apparent to a person ordinarily skilled in the art that the functionality of the electromechanical switch 106 is the known in the art method for conversing on two-way radios, known as Push-to-Talk (PTT).

Figure 2:
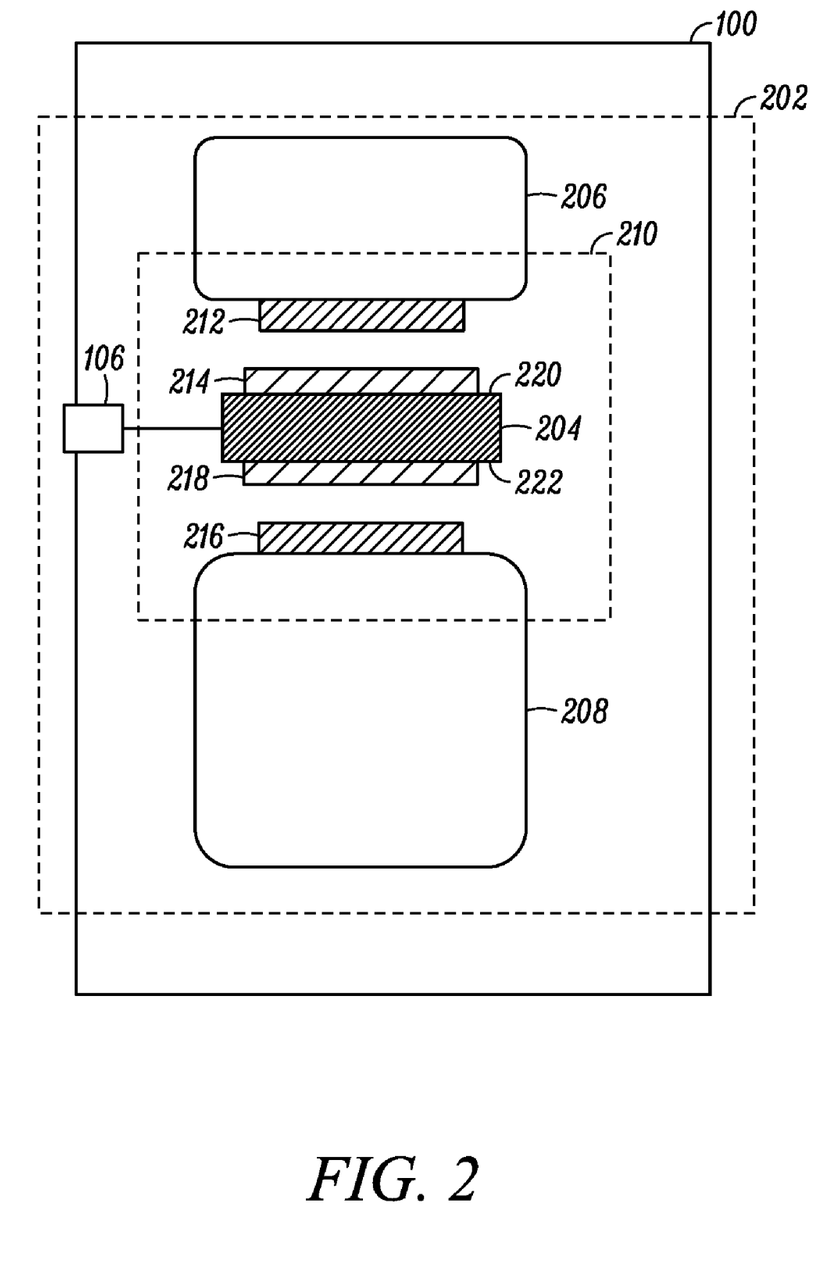
FIG. 2 illustrates an alerting system for a communication device, in accordance with an embodiment of the present invention.

FIG. 2 illustrates an alerting system 202 for the communication device 100, in accordance with an embodiment of the present invention. The alerting system 202 is designed to operate in a plurality of operating modes. The plurality of operating modes includes at least one of the speaker mode and the microphone mode. In the speaker mode, the user of the communication device 100 is able to hear incoming audio signals. Similarly, in the microphone mode, the user of the communication device 100 converses and generates audio waves, which are thereafter converted to electric impulses and transmitted as radio waves to a communication device of another user.

The alerting system 202 for the communication device 100 includes a transducer 204 and the electromechanical switch 106. The transducer 204 transforms electrical impulses into vibrations, and vice versa. Examples of the transducer 204 can be a dynamic transducer, an isodynamic transducer, an electrostatic transducer, a piezoelectric transducer, or an equivalent. In most common transducers such as the dynamic transducer, electric current is passed through a coil generating an alternating magnetic field. This alternating magnetic field reacts to a static magnetic field generated by a magnetic element, which, in turn, causes the coil to vibrate along with a diaphragm affixed to the coil. Subsequently, the vibrating diaphragm produces an audible sound that is proportional to the electric current. This process also works in reverse to produce an electric current that is proportional to the audible sound produced when the user converses. For one embodiment of the present invention, the transducer 204 is a piezoelectric transducer. The piezoelectric transducer produces voltage or electric impulses when subjected to pressure such as vibrations. For example, the vibrations of air molecules produced by the sound waves generated by the user can cause the piezoelectric transducer to vibrate. The piezoelectric transducer also works in a reverse fashion when vibrations are produced if the piezoelectric transducer is subjected to voltage or electric impulses. An example of a crystal that works as a piezoelectric transducer is Rochelle salt. In the speaker mode, the transducer 204 can vibrate in proportion to the frequency of the electric impulses when the electric impulses are applied to the transducer 204. In the microphone mode, the sound waves produced by the user during a conversation disturb the transducer 204, for example, the piezoelectric transducer, causing the transducer 204 to vibrate in proportion to the frequency of the audio impulses. Subsequently, the vibrations on the transducer 204 are transformed to electric impulses.

The electromechanical switch 106 couples the transducer 204 to a first component 206 in a first operating mode. Further, the electromechanical switch 106 couples the transducer 204 to a second component 208 in a second operating mode. For an embodiment of the present invention, the first operating mode can be the speaker mode and the second operating mode can be the microphone mode. For another embodiment of the present invention, the first operating mode can be the microphone mode and the second operating mode can be the speaker mode. In one embodiment, the first component 206 is the lens 102 for the visual display device of the communication device 100 and the second component 208 is at least one of a plate located in the communication device 100 and the keypad 104 of the communication device 100. The first component 206 is located in a first section of the communication device 100 and the second component 208 is located in a second section of the communication device 100. For example, the first component 206 is the lens 102, which is located in the first section of the communication device 100, and the second component 208 is the keypad 104, which is located in the second section of the communication device 100.

In the first operating mode such as the speaker mode, the transducer 204 such as the piezoelectric transducer can be coupled to the first component 206 such as the lens 102. Therefore, as the piezoelectric transducer vibrates proportional to the electrical impulses, the lens 102 also vibrates along with the piezoelectric transducer. Consequently, audible sound that is proportional to the vibration of the lens 102 is produced, which can be heard by the user of the communication device 100.

In the second operating mode such as the microphone mode, the transducer 204, such as the piezoelectric transducer, can be coupled to the second component 208 such as the keypad 104. In this scenario, when the audio waves generated by the user while conversing strikes the keypad 104, the keypad 104 vibrates. Since the keypad 104 and the piezoelectric transducer are coupled together, the vibrations from the keypad 104 are transmitted to the piezoelectric transducer. Consequently, the piezoelectric transducer converts these vibrations to electric impulses, which are then transmitted by the communication device 100 to another communication device.

The electromechanical switch 106 includes an electromagnetic actuator 210, which can alternately couple the transducer 204 to the first component 206 and the second component 208. In other words, the electromagnetic actuator 210 can couple the transducer 204 to the first component 206, and subsequently, the electromagnetic actuator 210 can couple the transducer 204 to the second component 208. The electromagnetic actuator 210 includes a first electromagnetic strip 212, a second electromagnetic strip 214, a third electromagnetic strip 216, and a fourth electromagnetic strip 218. The first electromagnetic strip 212 is mechanically coupled to the first component 206. The second electromagnetic strip 214 is mechanically coupled to a first surface 220 of the transducer 204. The first surface 220 of the transducer 204 faces the first component 206. The third electromagnetic strip 216 is mechanically coupled to the second component 208. The fourth electromagnetic strip 218 is mechanically coupled to a second surface 222 of the transducer 204. The second surface 222 of the transducer 204 faces the second component 208.

The electromechanical switch 106 is designed to alternately change the polarity of the first electromagnetic strip 212, the second electromagnetic strip 214, the third electromagnetic strip 216, and the fourth electromagnetic strip 218. By alternately changing the polarity, the transducer 204 can be alternately coupled to the first component 206 and the second component 208. The operation of the electromagnetic actuator 210 is described in the following paragraphs.

To facilitate the operation of the alerting system 202 in the speaker mode, the electromechanical switch 106 can set the polarity of the first electromagnetic strip 212 and the second electromagnetic strip 214 to have unlike charges, and the polarity of the third electromagnetic strip 216 and the fourth electromagnetic strip 218 to have like charges. For example, the first electromagnetic strip 212 can have a positive charge and the second electromagnetic strip 214 a negative charge; and the third electromagnetic strip 216 and the fourth electromagnetic strip 218 can both have positive charges or alternatively negative charges. As a result of the unlike charges, the first electromagnetic strip 212 is attracted to the second electromagnetic strip 214, thereby coupling the first component 206 and the transducer 204. The like charges of the third electromagnetic strip 216 and the fourth electromagnetic strip 218 result in the third electromagnetic strip 216 and the fourth electromagnetic strip 218 repelling each other, and thereby facilitating the coupling of the transducer 204 to the first component 206. Since the first component 206 and the transducer 204 are coupled together, the transducer 204 can transfer the vibrations to the first component 206.

To facilitate the operation of the alerting system 202 in the microphone mode, the electromechanical switch 106 can set the polarity of the third electromagnetic strip 216 and the fourth electromagnetic strip 218 to have unlike charges, and the polarity of the first electromagnetic strip 212 and the second electromagnetic strip 214 to have like charges. For example, the third electromagnetic strip 216 can have a positive charge and the fourth electromagnetic strip 218 a negative charge, and the first electromagnetic strip 212 and the second electromagnetic strip 214 can have either negative or positive charges. As a result of the unlike charges of the third electromagnetic strip 216 and the fourth electromagnetic strip 218, the third electromagnetic strip 216 is attracted to the fourth electromagnetic strip 218, thereby coupling the second component 208 and the transducer 204. The like charges of the first electromagnetic strip 212 and the second electromagnetic strip 214 result in the first electromagnetic strip 212 and the second electromagnetic strip 214 repelling each other, and thereby facilitating the coupling of the transducer 204 to the second component 208. Since the second component 208 and the transducer 204 are coupled together, the second component 208 can transfer the vibrations to the transducer 204.

The above-mentioned paragraphs describing the operation of the electromagnetic actuator 210 have been described with respect to the first operating mode being the speaker mode and the second operating mode being the microphone mode. It will be apparent to a person ordinarily skilled in the art that the above-mentioned paragraphs on the operation of the electromagnetic actuator 210 are also applicable to the first operating mode being the microphone mode or any equivalent alternative operation mode; and the second operating mode being the speaker mode or any equivalent alternative operating mode.

Figure 3:
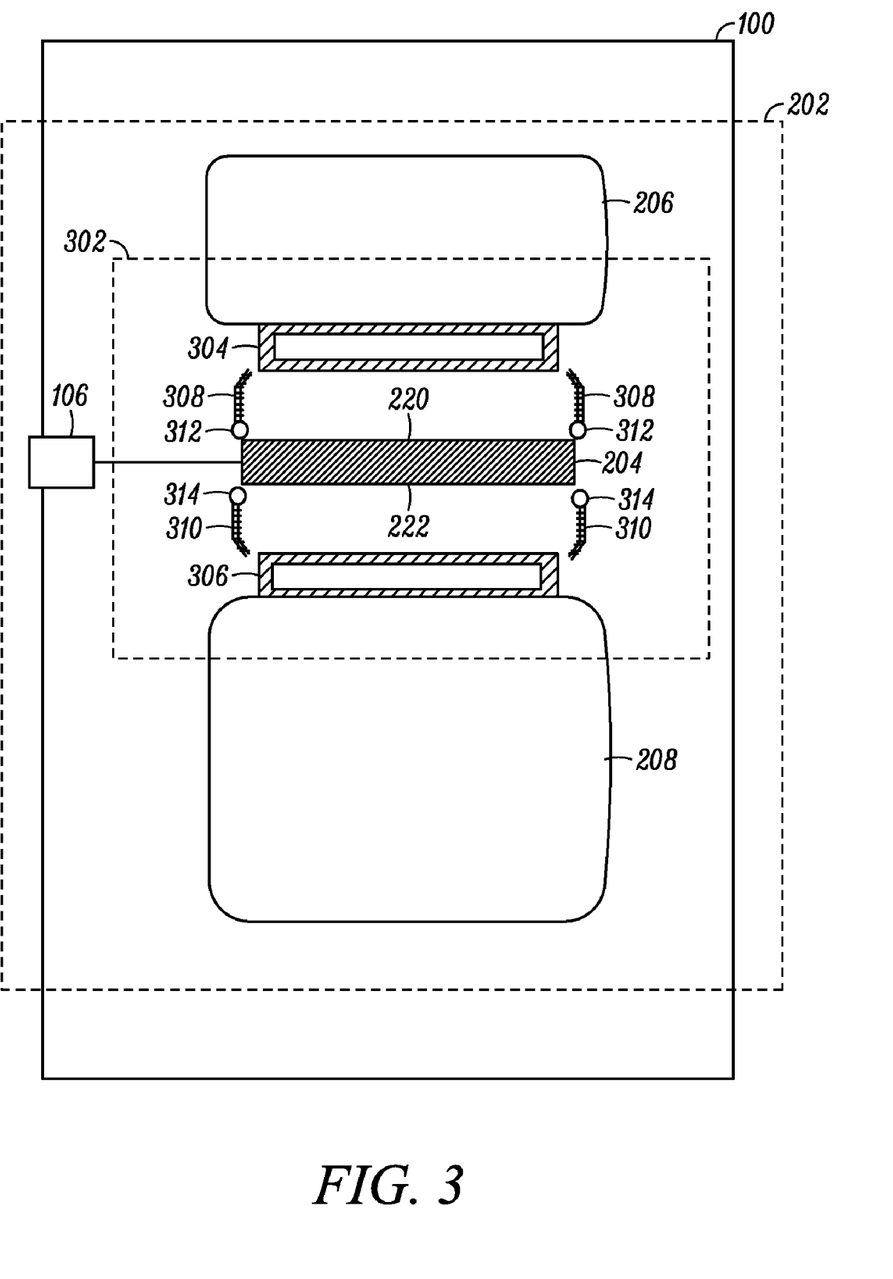
FIG. 3 illustrates an alerting system for a communication device, in accordance with another embodiment of the present invention.

FIG. 3 illustrates the alerting system 202 of the communication device 100, in accordance with another embodiment of the present invention. The alerting system 202 includes the electromechanical switch 106, the transducer 204, the first component 206, and the second component 208. The electromechanical switch 106 includes a mechanical actuator 302 for coupling the transducer 204 alternately to the first component 206 and the second component 208. The mechanical actuator 302 includes a first bracket 304 and a second bracket 306. The first bracket 304 is mechanically coupled to the first component 206 and the second bracket 306 is mechanically coupled to the second component 208. Further, the mechanical actuator 302 includes a first set of micro-gripping levers 308 and a second set of micro-gripping levers 310. A micro-gripping lever is a tool used in performing operations, such as gripping on micro- and nano-scale objects, because of its effectiveness and small size.

The first set of micro-gripping levers 308 is mechanically coupled to the first surface 220 of the transducer 204 and links the transducer 204 to the first bracket 304. The second set of micro-gripping levers 310 is mechanically coupled to the second surface 222 of the transducer 204 and links the transducer 204 to the second bracket 306.

The first set of micro-gripping levers 308 includes a first set of nano-motors 312, and the second set of micro-gripping levers 310 includes a second set of nano-motors 314. Nano-motors are piezo-driven motors that convert molecular energy into rotational movements. The first set of nano-motors 312 facilitates the first set of micro-gripping levers 308 to link with the first bracket 304. The second set of nano-motors 314 facilitates the second set of micro-gripping levers 310 to link with the second bracket 306. The operation of the mechanical actuator 302 is described in the following paragraphs.

To facilitate the operation of the alerting system 202 in the speaker mode, the electromechanical switch 106 energizes the first set of nano-motors 312 to execute operations such as rotational movement. Since the first set of nano-motors 312 is coupled to the first set of micro-gripping levers 308, the rotational movement generated by the first set of nano-motors 312 facilitates the first set of micro-gripping levers 308 to rotate. As a result, the first set of micro-gripping levers 308 rotates and clamps the first bracket 304, thereby coupling the transducer 204 with the first component 206. Therefore, the vibration from the transducer 204 can be transferred to the first component 206, enabling the production of audible sound.

To facilitate the operation of the communication device 100 in the microphone mode, the electromechanical switch 106 energizes the second set of nano-motors 314 to execute operations such as rotational movement. Since the second set of nano-motors 314 are coupled to the second set of micro-gripping levers 310, the rotational movement generated by the second set of nano-motors 314 facilitates the second set of micro-gripping levers 310 to rotate. As a result, the second set of micro-gripping levers 310 rotates and clamps against the second bracket 306, thereby coupling the transducer 204 with the second component 208. Consequently, the vibrations on the second component 208, produced due to audio impulses when the user converses, is transferred to the transducer 204, thereby converting the vibrations to electrical impulses.

The above-mentioned paragraphs describing the operation of the mechanical actuator 302 have been described with respect to the first operating mode being the speaker mode and the second operating mode being the microphone mode. It will be apparent to a person ordinarily skilled in the art that the above-mentioned paragraphs describing the operation of the mechanical actuator 302 are also applicable to the first operating mode being the microphone mode or any equivalent alternative mode; and the second operating mode being the speaker mode or any equivalent alternative mode.

Figure 4:
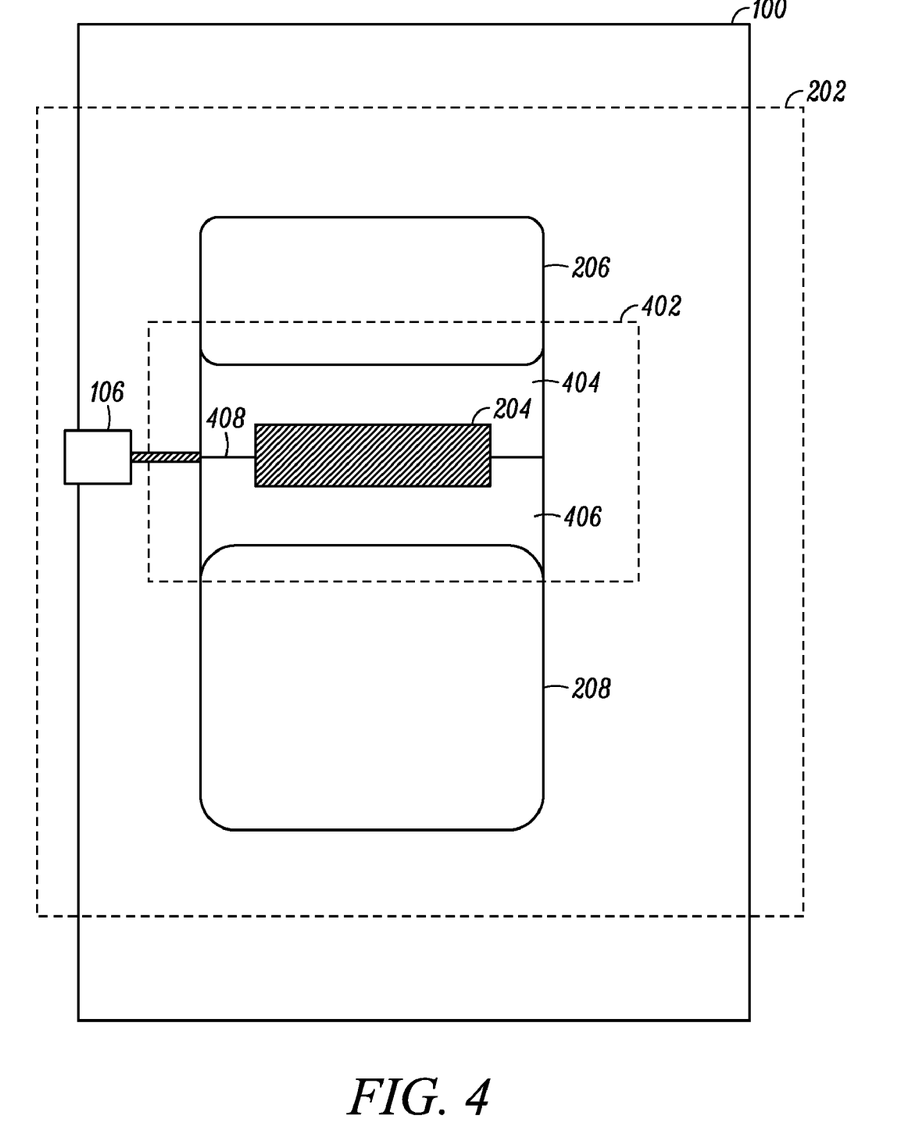
FIG. 4 illustrates an alerting system for a communication device, in accordance with yet another embodiment of the present invention.

FIG. 4 illustrates the alerting system 202 of the communication device 100, in accordance with yet another embodiment of the present invention. The alerting system 202 includes the electromechanical switch 106, the transducer 204, the first component 206, and the second component 208. The electromechanical switch 106 includes a vacuum pressure actuator 402 for coupling the transducer 204 alternately to the first component 206 and the second component 208. The vacuum pressure actuator 402 includes a first enclosure 404 and a second enclosure 406. The first enclosure 404 and the second enclosure 406 can contain pressurized air and vacuum. The vacuum pressure actuator 402 also includes an elastic membrane 408, which is coupled to the transducer 204. The elastic membrane 408 separates the first enclosure 404 and the second enclosure 406. The separation of the first enclosure 404 and the second enclosure 406 helps to separate the pressurized air and vacuum contained in either the first enclosure 404 or the second enclosure 406. Further, the elastic membrane 408 is designed to allow vibrations. The operation of the vacuum pressure actuator 402 is described in the following paragraphs.

To facilitate the operation of the alerting system 202 in the speaker mode, the electromechanical switch 106 enables the first enclosure 404 to be filled with pressurized air and the creation of a vacuum in the second enclosure 406. The elastic membrane 408 helps the first enclosure 404 to contain the pressurized air such that the pressurized air does not leak into the second enclosure 406. When the transducer 204 vibrates due to electrical impulses, the elastic membrane 408 vibrates along with transducer 204. The vibrations from the elastic membrane 408 are transferred to the first component 206 over the pressurized air, which acts as a medium between the transducer 204 and the first component 206. Further, since the second enclosure 406 contains vacuum, the vibrations from the elastic membrane 408 are not transferred to the second component 208, since vibrations do not travel in vacuum, thereby retaining the intensity of the vibrations while transferring them to the first component 206. Consequently, the vibrations on the first component 206 are converted into audible sound.

To facilitate the operation of the alerting system 202 in the microphone mode, the electromechanical switch 106 enables the second enclosure 406 to be filled with pressurized air and the creation of a vacuum in the first enclosure 404. The elastic membrane 408 assists the second enclosure 406 to contain the pressurized air such that the pressurized air does not leak into the first enclosure 404. When the user converses on the communication device 100, generating audio impulses that cause the second component 208 to vibrate, the vibrations from the second component 208 are transferred to the elastic membrane 408. The vibrations from the second component 208 are transmitted over the pressurized air, which acts as the medium between the elastic membrane 408 and the second component 208. The vibrations on the elastic membrane 408, in turn, vibrate the transducer 204 that is coupled to the elastic membrane 408. The vibrations of the transducer 204 are then converted to electrical impulses by the transducer 204.

The above-mentioned paragraphs describing the operation of the vacuum pressure actuator 402 have been described with respect to the first operating mode being the speaker mode and the second operating mode being the microphone mode. It will be apparent to a person ordinarily skilled in the art that the above-mentioned paragraphs on the operation of the vacuum pressure actuator 402 are also applicable to the first operating mode being the microphone mode or an equivalent alternative operating mode; and the second operating mode being the speaker mode or an equivalent alternative operation mode.

Figure 5:
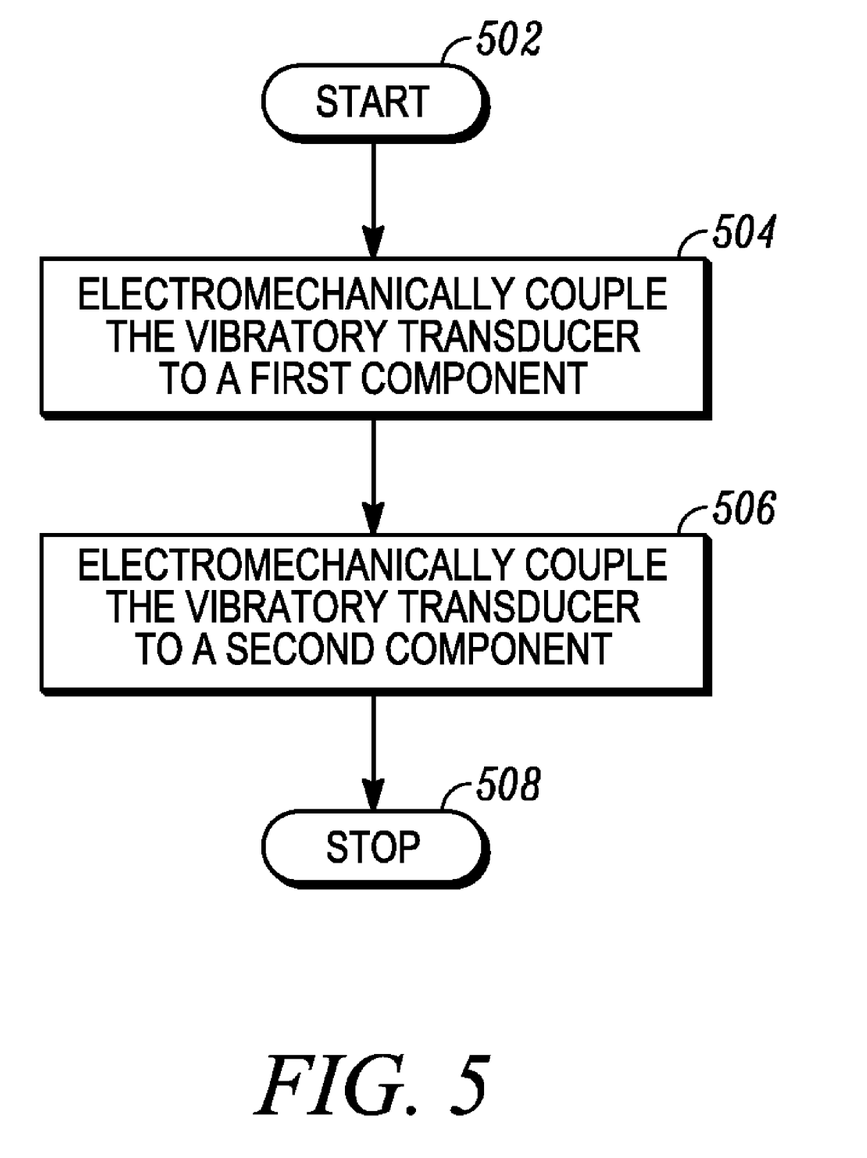
FIG. 5 is a flow diagram illustrating a method of operation of a communication device, in accordance with an embodiment of the present invention.

FIG. 5 is a flow diagram illustrating a method of operation of a communication device 100, in accordance with an embodiment of the present invention. The method is initiated at step 502. At step 504, the transducer 204, hereinafter referred to as a vibratory transducer 204, is electromechanically coupled to the first component 206. The vibratory transducer 204 provides a first vibration manner in a first operating mode to the first component 206. For example, when the first operating mode is the speaker mode, the vibratory transducer 204 facilitates the first component 206 to vibrate, thereby producing an audible sound. This is referred to as the first vibration manner. The first component 206 can be the lens 102 for the visual display device for the communication device 100. In the speaker mode, when the user of the communication device 100, such as the mobile telephone, wants to hear the audible sound reproduced at the mobile telephone, the user has to bring his/her ear closer to the lens 102. Since the lens 102 is coupled to the transducer 204 in the speaker mode, the lens 102 vibrates along with the vibrations of the transducer 204, thereby producing the audible sound.

At step 506, the vibratory transducer 204 is electromechanically coupled to the second component 208. The vibratory transducer 204 provides a second vibration manner in the second operating mode to the second component 208. For example, when the second operating mode is the microphone mode, the second component 208 vibrates, causing the vibratory transducer 204 to vibrate, thereby producing electric impulses. This is referred to as the second vibration manner. The second component 208 can be at least one of a plate located in the communication device 100 and the keypad 104 of the communication device 100. When the user requires transmitting his/her voice, the user has to converse close to the plate located in the mobile telephone. Hence, the plate can vibrate due to the vibrations of the audio waves generated when the user converses. Since the plate is coupled to the transducer 204 in the microphone mode, the vibrations on the plate are transferred to the transducer 204, thereby vibrating the transducer 204. The transducer 204 then converts the vibration into electrical impulses and hence transmits the electrical impulses.

According to the requirement of the user, the speaker mode is used when the user require to hear the audible sound, and the microphone mode is used when the user require to converse. In this manner, the transducer 204 is coupled alternately to the first component 206 and the second component 208 depending upon the requirement of the user. Further, the vibratory transducer 204 can be a piezoelectric transducer. Thereafter, the method is terminated at step 508.

The embodiments of an alerting system for a communication device designed to operate in a plurality of operating modes offer numerous advantages. One advantage is the use of a single transducer for the alerting system of the communication device. The single transducer enables the size of the communication device to be smaller, thinner and sleeker. The less volume used by the single transducer also enables additional electronic components, which provide additional operational features, to be accommodated in the communication device, thereby increasing the functionality of the communication device. Another advantage is the use of two separate components in the alerting system for vibration, such as a lens of a visual display device in the speaker mode and a keypad in the microphone mode, which does not cause harm to a user's ear. Since there are two components for vibration, as compared to conventional single transducer communication devices, a situation where the user has to bring his/her ear close to the vibrating component in the microphone mode does not arise.

It will be appreciated that the alerting system for a communication device described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of an alerting system for a communication device. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one of ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one of ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. An alerting system for a communication device designed to operate in a plurality of operating modes, the alerting system comprising:
   a transducer for transforming electrical impulses into vibrations and for transforming vibrations into electrical impulses; and
   an electromechanical switch, wherein the electromechanical switch couples the transducer to a first component of the communication device as a first air interface for one of receiving and generating sound in a first operating mode, and further wherein the electromechanical switch couples the transducer to a second component of the communication device as a second air interface for the other one of receiving and generating sound in a second operating mode, wherein the electromechanical switch couples the transducer to only one of the first and second components in each mode.

2. The alerting system as recited in claim 1, wherein the first component is a lens for a visual display device of the communication device.

3. The alerting system as recited in claim 2, wherein the second component is at least one of a plate located in the communication device and a keypad of the communication device.

4. The alerting system as recited in claim 1, wherein the plurality of operating modes comprises a speaker mode and a microphone mode.

5. The alerting system as recited in claim 1, wherein the electromechanical switch comprises an electromagnetic actuator.

6. The alerting system as recited in claim 5, wherein the electromagnetic actuator comprises:
   a first electromagnetic strip mechanically coupled to the first component;
   a second electromagnetic strip mechanically coupled to a first surface of the transducer;
   a third electromagnetic strip mechanically coupled to the second component; and
   a fourth electromagnetic strip mechanically coupled to a second surface of the transducer.

7. The alerting system as recited in claim 6, wherein the electromechanical switch is designed to alternately change the polarity of the first electromagnetic strip, the second electromagnetic strip, the third electromagnetic strip and the fourth electromagnetic strip.

8. The alerting system as recited in claim 1, wherein the electromechanical switch comprises a mechanical actuator.

9. The alerting system as recited in claim 8, wherein the mechanical actuator comprises:
   a first bracket mechanically coupled to the first component;
   a second bracket mechanically coupled to the second component;
   a first set of micro-gripping levers mechanically coupled to a first surface of the transducer, wherein the first set of micro-gripping levers links the transducer to the first bracket; and
   a second set of micro-gripping levers mechanically coupled to a second surface of the transducer, wherein the second set of micro-gripping levers links the transducer to the second bracket.

10. The alerting system as recited in claim 9, wherein the first set of micro-gripping levers comprises a first set of nano-motors, the first set of nano-motors facilitates the linking of the first set of micro-gripping levers to the first bracket.

11. The alerting system as recited in claim 9, wherein the second set of micro-gripping levers comprises a second set of nano-motors, the second set of nano-motors facilitates the linking of the second set of micro-gripping levers to the second bracket.

12. The alerting system as recited in claim 1, wherein the electromechanical switch comprises a vacuum pressure actuator.

13. The alerting system as recited in claim 12, wherein the vacuum pressure actuator comprises:
   a first enclosure for containing pressurized air and vacuum;
   a second enclosure for containing pressurized air and vacuum; and
   an elastic membrane designed to allow vibration, wherein the elastic membrane separates the first enclosure and the second enclosure.

14. The alerting system as recited in claim 13, wherein the electromechanical switch pressurizes and creates a vacuum in the first enclosure in the first mode of operation, and the second enclosure in the second mode of operation.

15. A communication device designed to operate in a plurality of operating modes, the communication device comprising:
   a first component located in a first section of the communication device;
   a second component located in a second section of the communication device;
   a transducer for transforming vibrations into electrical impulses and for transforming vibrations into electrical impulses; and
   an electromechanical switch, wherein the electromechanical switch couples the transducer to the first component as a first air interface for one of receiving and generating sound in a first operating mode, and further wherein the electromechanical switch couples the transducer to the second component as a second air interface for the other one of receiving and generating sound, and wherein the electromechanical switch couples the transducer to only one of the first and second components in each mode.

16. The communication device as recited in claim 15, wherein the first component is a lens for a visual display device of the communication device.

17. The communication device as recited in claim 16, wherein the second component is at least one of a plate located in the communication device and a keypad of the communication device.

18. The communication device as recited in claim 15, wherein the electromechanical switch comprises an electromagnetic actuator.

19. The communication device as recited in claim 15, wherein the electromechanical switch comprises a mechanical actuator.

20. The communication device as recited in claim 15, wherein the electromechanical switch comprises a vacuum pressure actuator.

21. A method of operation of a communication device comprising a vibratory transducer and at least two components:
   electromechanically coupling the vibratory transducer to a first component of the communications device as a first air interface for providing a first vibration manner comprising one of receiving and generating sound, in a first operating mode; and
   electromechanically coupling the vibratory transducer to a second component of the communications device as a second air interface providing a second vibration manner comprising the other one of receiving and generating sound, wherein only one of the first and second components being coupled to the transducer in each mode.

22. The method as recited in claim 21, wherein the first component is a lens for a visual display device of the communication device.

23. The method as recited in claim 22, wherein the second component is at least one of a plate located in the communication device and a keypad of the communication device.

24. The method as recited in claim 21, wherein the transducer is a piezoelectric transducer.

* * * * *